US009252479B2

(12) United States Patent
Kolokotronis

(10) Patent No.: US 9,252,479 B2
(45) Date of Patent: Feb. 2, 2016

(54) ANTENNA MAST

(71) Applicant: FASMETRICS S.A., Attiki (GR)

(72) Inventor: Dimitris Kolokotronis, Athens (GR)

(73) Assignee: FASMETRICS S.A., Attiki (GR)

( * ) Notice: Subject to any disclaimer, the term of this patent is extended or adjusted under 35 U.S.C. 154(b) by 41 days.

(21) Appl. No.: 14/367,024

(22) PCT Filed: Dec. 24, 2012

(86) PCT No.: PCT/EP2012/076884
§ 371 (c)(1),
(2) Date: Jun. 19, 2014

(87) PCT Pub. No.: WO2013/098281
PCT Pub. Date: Jul. 4, 2013

(65) Prior Publication Data
US 2015/0013261 A1    Jan. 15, 2015

(30) Foreign Application Priority Data
Dec. 28, 2011    (GB) .................................. 1122382.3

(51) Int. Cl.
*A47B 96/06*    (2006.01)
*H01Q 1/12*    (2006.01)
*B23P 15/00*    (2006.01)

(52) U.S. Cl.
CPC .............. *H01Q 1/1242* (2013.01); *B23P 15/00* (2013.01); *Y10T 29/49826* (2015.01); *Y10T 29/49895* (2015.01)

(58) Field of Classification Search
CPC ........................... H01Q 1/1235; H01Q 1/1242
USPC ............... 52/651.07; 343/886, 887, 888, 889, 343/890, 891; 248/218.4
See application file for complete search history.

(56) References Cited

U.S. PATENT DOCUMENTS

| 5,101,215 | A | | 3/1992 | Creaser, Jr. | |
|---|---|---|---|---|---|
| 5,218,375 | A | | 6/1993 | Hillman | |
| 5,557,892 | A | | 9/1996 | Lavin | |
| 5,641,141 | A | * | 6/1997 | Goodwin | ................... 248/218.4 |
| 5,786,854 | A | | 7/1998 | Slade | |
| 5,995,063 | A | * | 11/1999 | Somoza et al. | ............... 343/890 |
| 6,739,561 | B2 | * | 5/2004 | Herzog | ....................... 248/218.4 |

(Continued)

FOREIGN PATENT DOCUMENTS

| DE | 4006958 | 9/1991 |
|---|---|---|
| DE | 102005063234 | 6/2007 |

(Continued)

OTHER PUBLICATIONS

International Search Report and Written Opinion in PCT/EP2012/076884 dated Apr. 2, 2013.

(Continued)

*Primary Examiner* — Charles A Fox
*Assistant Examiner* — James Buckle, Jr.
(74) *Attorney, Agent, or Firm* — Barnes & Thornburg LLP

(57) ABSTRACT

A cellular communications antenna mast assembly (300) comprising a first component (332) having a longitudinal axis and a first profile oriented perpendicular to the longitudinal axis, a second component (330) arranged to engage the first profile so as to engage the first mast component and second mast component to constrain relative rotation thereof about the longitudinal axis, and to provide a datum transfer between the mast components, having only one orientation in which they can be engaged.

20 Claims, 12 Drawing Sheets

(56) References Cited

U.S. PATENT DOCUMENTS

2004/0066353 A1* 4/2004 Ernest Ehlen et al. ........ 343/891
2011/0156984 A1   6/2011 Caldwell et al.

FOREIGN PATENT DOCUMENTS

| | | |
|---|---|---|
| GB | 1180776 | 2/1970 |
| GB | 2045309 | 10/1980 |
| GB | 2460637 | 12/2009 |
| WO | WO 2011042226 | 4/2011 |

OTHER PUBLICATIONS

United Kingdom Search Report in GB1122382.3 dated Nov. 14, 2012.

* cited by examiner

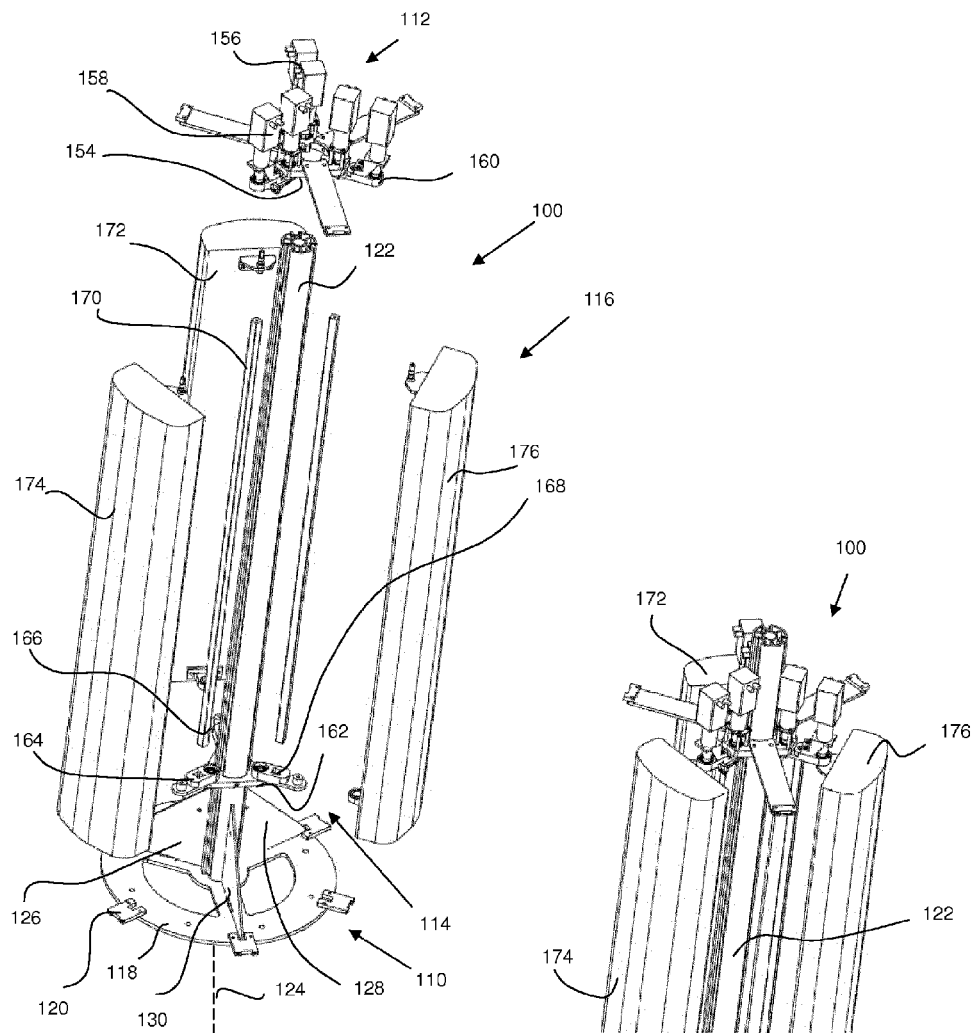
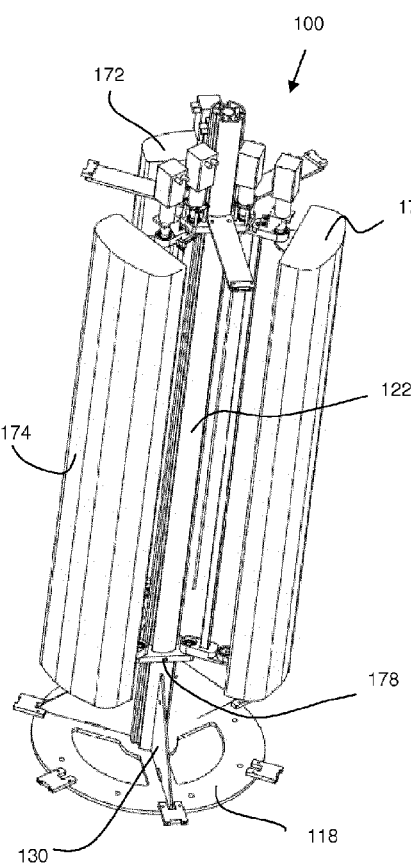
Fig. 1a
Fig. 1b

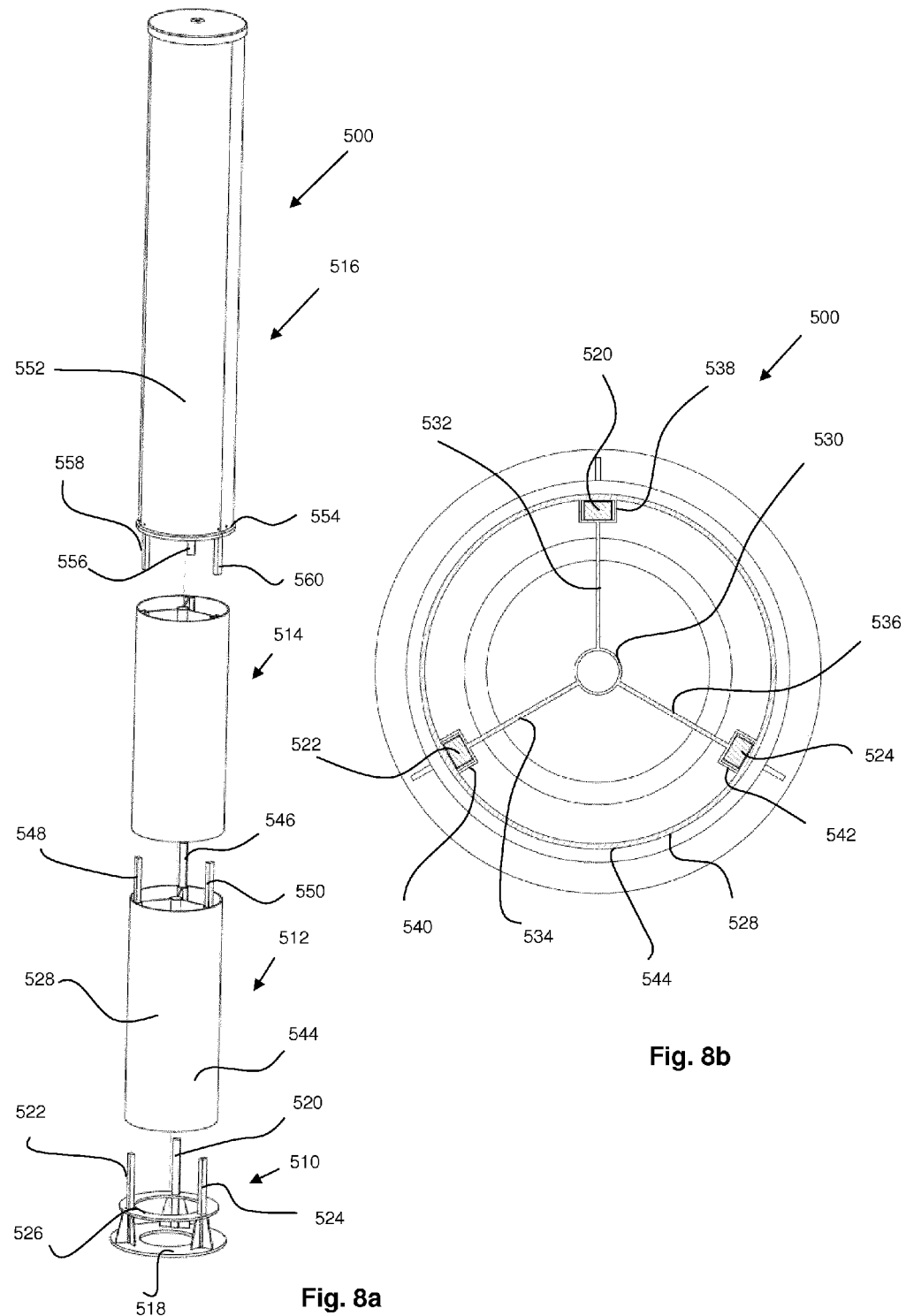

ND ANTENNA MAST

CROSS REFERENCE TO RELATED APPLICATIONS

This application is a U.S. nationalization under 35 U.S.C. §371 of International Application No. PCT/EP/2012/076884, filed Dec. 24, 2012, which claims priority to United Kingdom Patent Application No. 1122382.3, filed Dec. 28, 2011. The disclosures set forth in the referenced applications are incorporated herein by reference in their entireties.

The present invention is concerned with a mast assembly for an antenna mast, and a method of aligning an antenna. More specifically, the present invention is concerned with a mast assembly and method for transferring a datum point from a mast component such as a base to an antenna mount.

Masts for cellular communications antennae are known in the art, for example, from the applicant's prior published patent application, WO2011/042226, the contents of which are hereby incorporated by reference where permitted. In this prior art application, a modular cellular communications mast is described, comprising a plurality of modules which can be selectively arranged to provide a suitable mast. The modules comprise markings which enable an orientation to be transferred from a base to the antenna mount on top of the mast. Therefore the direction in which the antennas face can be determined by correct positioning of the base. Subsequent assembly of the mast "transfers the datum" to the antenna mounts. This removes the requirement to calibrate the antennas in situ.

One problem with this approach, is that by using the load-bearing structure to transfer the datum point to the antenna mount, the antenna modules must be accurately manufactured. Any misalignment in the individual modules (say, a twist) will be magnified with increased modules used. Unfortunately, known mast components are constructed from simple trusses which are not well suited to accurate manufacture.

A further problem with the prior art, is that in order to secure the various components together, several mechanical fasteners (usually bolts) are required. It is known in the engineering and design of mast structures that in order to provide maximum stiffness at minimum weight, material should be positioned away from the mast axis. This provides a mast with a high second moment of area. Therefore traditional antenna masts use a number of steel beams (usually L-section beams) which are arranged in a space-frame type structure and secured together with mechanical fasteners. Not only is this time consuming to manufacture, but also expensive due to the number of components involved. Loosening of the fasteners is also a risk.

A still further problem with the prior art is that the antenna mast modules can be installed in a number of angular orientations about the main mast axis. For example if the truss structure is triangular in section, adjacent modules can be installed in any one of three angular positions, 60 degrees apart. Therefore it is possible to incorrectly orient the antenna brackets if the datum marks are accidentally disregarded. As such his system is vulnerable to installer error.

It is an object of the present invention to overcome or at least mitigate the aforementioned problems.

According to the present invention, there is provided a cellular communications antenna mast assembly comprising:
a first component having a longitudinal axis and a first profile oriented perpendicular to the longitudinal axis; and,
a second component having a second profile arranged to mate with the first profile so as to co-engage the first mast component and second mast component to constrain relative rotation thereof about the longitudinal axis, in which the first profile and the second profile are shaped so as to permit engagement in only one angular position about the longitudinal axis;
in which one of the first and second components is connected to a mast component, and the other of the first and second components is connected to an antenna mounting bracket, such that the mast component and antenna mounting bracket are aligned in a predetermined orientation.

Preferably at least the first component comprises an extruded section defining the first profile in cross-section. The first component may be entirely extruded. The term "component" is to be construed broadly, and may refer to either a unitary member or a sub-assembly.

The first and second components may either be part of the mast structure, or a separate alignment tool which is provided but does not carry a significant load. In either case, alignment of the antenna mounting bracket is guaranteed because the components can only be installed in a single angular configuration.

Further, in the event that the first and second components are structural, providing an extruded mast component results in a lightweight and strong construction. The first profile can be engineered to have a large second moment of area to resist bending loads on the mast. In particular, the component may be constructed from aluminium or an extrudable alloy such as a magnesium alloy. Furthermore, engagement of the first and second components to constrain relative rotation thereof permits a limited number of engagement positions and, as such, it is much easier for alignment to be carried through the various mast modules to the antennas.

Preferably, the cellular communications antenna mast assembly has at least one of the first profile and the second mast component shaped so as to permit engagement in only one angular position about the longitudinal axis.

Advantageously, permitting engagement in only one angular position negates the need for visual datum points on the mast components and manual alignment upon installation. As such, the mast can be constructed carrying the datum point through from the base to the antenna with minimum error and effort.

Preferably, the first profile is defined as the outer edge of an orifice, and the second mast component comprises a second, male, profile arranged to mate with the first profile. Therefore a "mating fit" is provided.

More preferably, the second mast component is also extruded. In this manner, the two mast components can mate with a large contact surface area to resist any bending. Fastening is required in the axial direction only.

Preferably, the first mast component defines a wall having an outer surface, in which the first profile lies on an interior surface of the wall. Advantageously, by providing a male second mast component as large as possible engaging with the inside of the outer wall of the first mast component, it is possible to provide as strong a joint as possible.

Preferably, the second mast component comprises a mechanical stop to constrain relative axial movement of the first mast component and the second mast component. More preferably, the mechanical stop forms part of an antenna mounting bracket. Advantageously, providing the mounting bracket at a particular position on the second component allows for a mechanical stop to automatically be built in.

Preferably, the first mast component has a first end and a second end, the second mast component is mounted at the first end, a third mast component is provided and is mounted at the second end, and, the second and third mast components define spaced mounting points of an antenna bracket. In this manner the upper and lower positions of an antenna can be accurately positioned without need for measuring the distance between them.

As an option to the aforementioned engagement scheme between the first and second components, a cellular communications antenna mast assembly may be provided in which the first profile is defined as an outer edge of a male formation, and the second mast component comprises a second, female, profile arranged to mate with the first profile.

By providing a female second component, the second component can be positioned as desired on the outer surface of the male mast component by axial sliding. This is useful e.g. for antenna brackets.

Preferably, the second mast component is flat. More preferably, the second mast component comprises at least one antenna mounting formation. Still more preferably, a radially oriented mechanical fastener is provided to constrain relative axial motion of the first and second mast components.

By providing a flat plate-like component which has a mast component mounted thereon with a mechanical fastener, the exact position on the first mast component can be chosen by the installer which means that different heights of antennas can be installed per the customer requirement.

Preferably, a cellular communications antenna mast assembly is provided comprising a third mast component being spaced from the second mast component and comprising at least one antenna mounting formation.

Preferably the assembly comprises a third mast component having the first profile, such that the second component mates simultaneously with the first and third components. Preferably the first and third components abut to restrain relative axial movement.

In other words, the first and third mast components having the same profile (i.e. of the same size and shape) are incompatible, and cannot slide within one another. Thus telescoping of the assembly is avoided.

According to a second aspect of the invention there is provided a method of manufacture of a cellular communications antenna mast assembly comprising the steps of:
 (i) extruding a first mast component comprising a longitudinal axis and a first profile oriented perpendicular to the longitudinal axis,
 (ii) providing a second mast component having a second profile complementary to the first profile, and;
 (iii) assembling the first and second mast component by mating the profiles.

Preferably, the first and second profiles are selected to constrain relative rotation of the first and second components when assembled. More preferably, the step of assembling comprises the step of inserting the first component into an orifice of the second component. Still more preferably, the step of assembling comprises the step of inserting the second component into an orifice of the first component. Even more preferably, the method comprises the step of axially fastening the first and second components.

Example mast assemblies will now be described with reference to the accompanying figures, in which:

FIG. 1a is an exploded perspective view of a first mast assembly in accordance with the present invention;

FIG. 1b is an assembled view of the mast assembly of FIG. 1a;

FIG. 5a shows an exploded view of a third mast assembly in accordance with the present invention;

FIG. 5b shows an exploded view of the mast assembly of FIG. 5a;

FIG. 8a shows a perspective view of a fifth mast assembly in accordance with the present invention;

FIG. 8b shows a section view of a part of the mast assembly of FIG. 8a;

FIG. 9b shows a section view of a part of the mast assembly of FIG. 9a;

Figure 2:
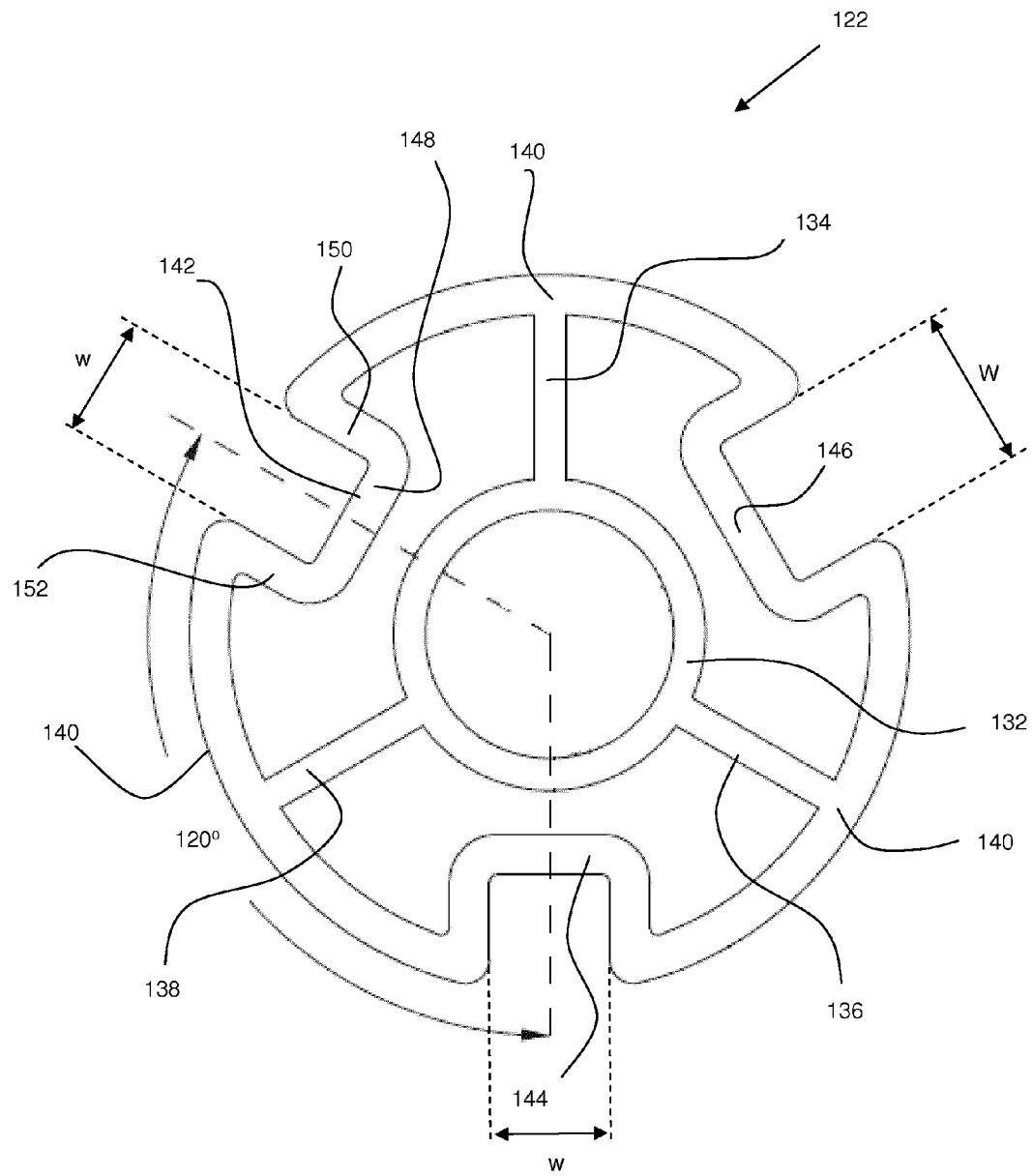
FIG. 2 is a section view of a part of the assembly of FIGS. 1a and 1b.

Referring to FIGS. 1a and 1b, there is provided a cellular communications mast assembly 100. The assembly 100 generally comprises a first mast component 110, a first antenna mounting assembly 112, a second antenna mounting assembly 114, and a plurality of antennas 116.

The first mast component 110 comprises a generally round, flat base plate 118 defining six equally spaced mounting points 120 around its periphery. These mounting points 120 can be used to attach the base plate to a structure such as a building, or a vehicle.

Extending from the base plate 118 in a perpendicular, axial direction from a centre thereof, is an extruded section 122. A longitudinal axis 124 which runs through the geometric centre of the base plate 118 and is coincident with the longitudinal axis of the extruded section 122.

Three flange plates 126, 128, 130 extend from the extruded section 122, and meet the base plate 118. The flange plates 126, 128 and 130 are perpendicular to the base plate 118. They are welded to both the base plate 118 and to the extruded section 122 to reinforce the join between the two components.

Turning to FIG. 2, there is shown a cross-sectional view of the extruded section 122. The section comprises a central circular region 130 having three radially extending ribs 134, 136, 138, extending at equal, equidistant angles from the centre. Each rib is of equal length. Each rib is 120 degrees apart (because there are three ribs).

An outer circular region 140 is provided which joins each of the outer edges of the ribs 134, 136, 138. At equidistant positions offset at 60 degrees from each of the ribs 134, 136, 138, there are positioned recesses 142, 144, 146 in the outer circular region 140. Each of the recesses 142, 144, 146 generally describes a rectangular profile having a flat base portion 148 and two side wall portions 150, 152 extending radially outwardly to meet the outer circular region 140.

The first and second recesses 142, 144 have a width between the side walls 150, 152 of w. The third recess 146 has a width across the side walls of W, wherein W>w. The functional benefit of this feature will be described below.

It will be noted that the recesses 142, 144, 146 also lie 120 degrees apart.

Turning back to FIGS. 1a and 1b, the first antenna mounting assembly 112 comprises a second mast component in the form of a mounting plate 154. The mounting plate 154 is generally flat and defines a through bore in the shape of the outer profile of the extruded section 122 as shown in FIG. 2.

Extending from the mounting plate 154, there are provided three antenna mounting and actuation assemblies 156, 158, 160. Each of these arrangement is similar to that as disclosed in the applicant's earlier patent application and, as such, will not be described in further detail here.

Turning to the second antenna mounting assembly 114, a mounting plate 162 is provided substantially identical to the mounting plate 154. Three passive mounting arrangements 164, 166, 168 corresponding to the first, second and third actuating arrangements 156, 158, 160 are provided. Each of the passive mounting arrangements 164, 166, 168 allow articulation per the active arrangements, the main difference being that the passive arrangements are not motorised.

A series of support rods generally indicated at 170 extend between each of the active and passive mounting arrangements. These provide stability and prevent any torsional loads from being applied to the antennas in use.

The plurality of antennas 116, comprises a first, second and third cellular communications antennas 172, 174, 176 respectively, each of which is mounted between the active and passive mounting arrangements parallel to the axis 124.

It will be noted that each of the mounting plates 154, 162 comprises an orifice corresponding to the outer profile of the extruded section 122 in cross-section as shown in FIG. 2. As such, each of the mounting plates can slide up and down on the extruded section 122 in order to accommodate various different sizes of antennas. When in the correct position, each of the mounting plates 154, 162 is secured by a mechanical fastener 178 which secures it in place by engaging with a respective mechanical feature (such as a hole) on extruded section 122 or, alternatively, simply by friction.

It will also be noted that because of the difference in width of one of the recesses 146 compared to the other two recesses 122, 144, the mounting plates 154, 162 can only be oriented in one particular angular position about the axis 124. Therefore, incorrect positioning of the antenna's mounting assemblies is avoided.

Turning to FIGS. 3a to 3e, an assembly process for the assembly 100 is shown.

Figure 3C:
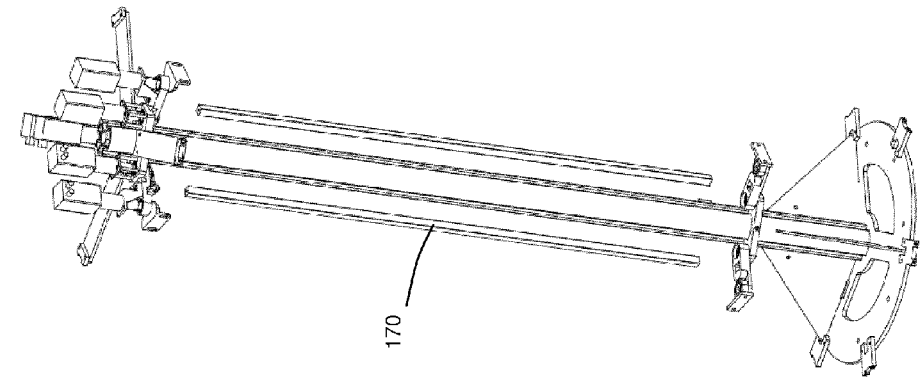
FIGS. 3a to 3e show various stages in the manufacture of the mast assembly of FIGS. 1a, 1b and 2.
Figure 3B:
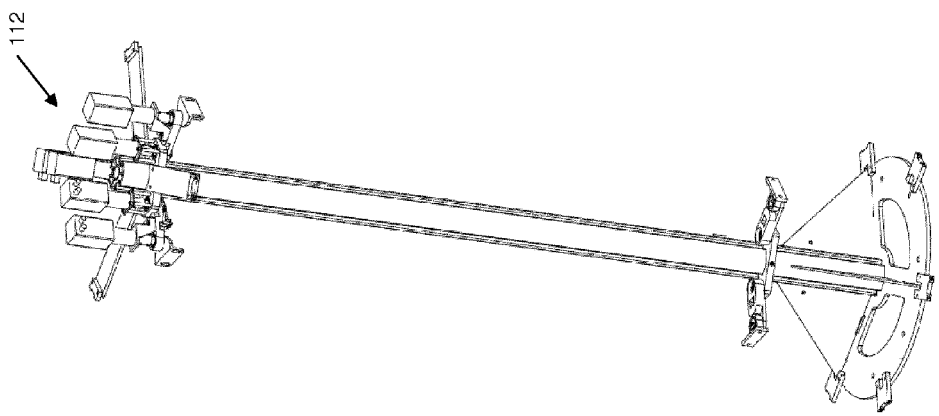
Figure 3A:
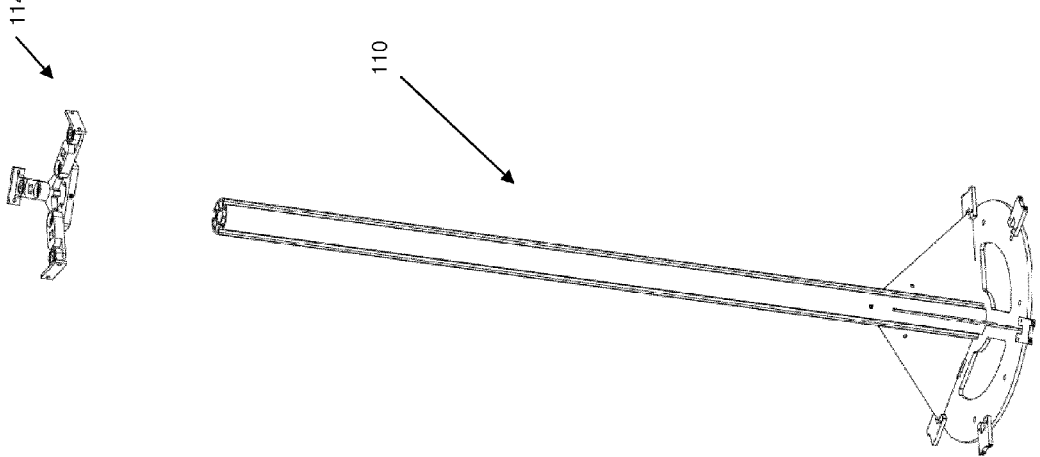

At FIG. 3a, the first mast component 110 is provided and the second antenna mounting assembly 114 is slid over the profile of the extruded section 122 as shown in FIG. 3b. Once this the second mounting assembly 114 is in position, as shown in FIG. 3b, the first antenna mounting assembly 112 is provided at the opposite end of the extruded section 122.

The distance between the two mounting assemblies 112, 114 is then set by installing the support rods 170 therebetween. Both the first and second mounting assemblies 112, 114 are secured in place by use of appropriate fasteners inserted in a radial direction through the relevant mounting plates into the extruded section 122.

Figure 3E:
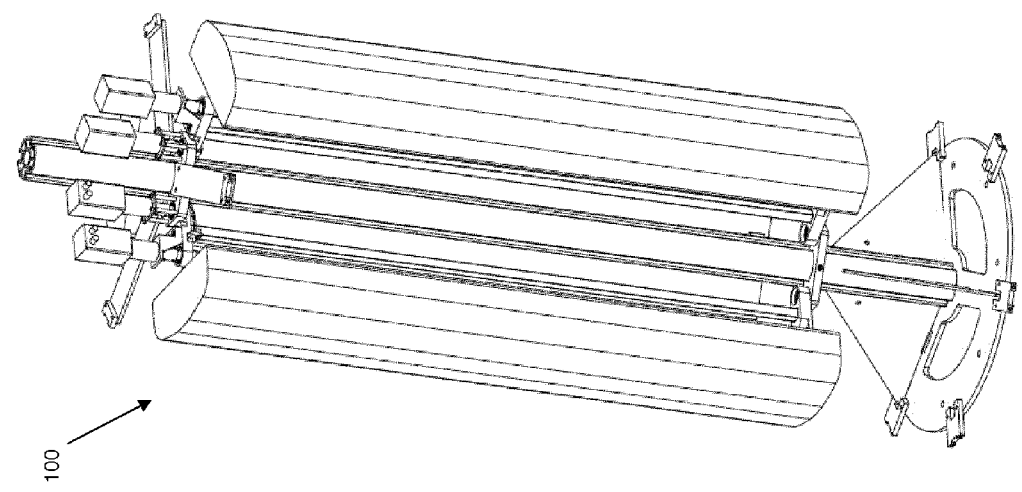
Figure 3D:
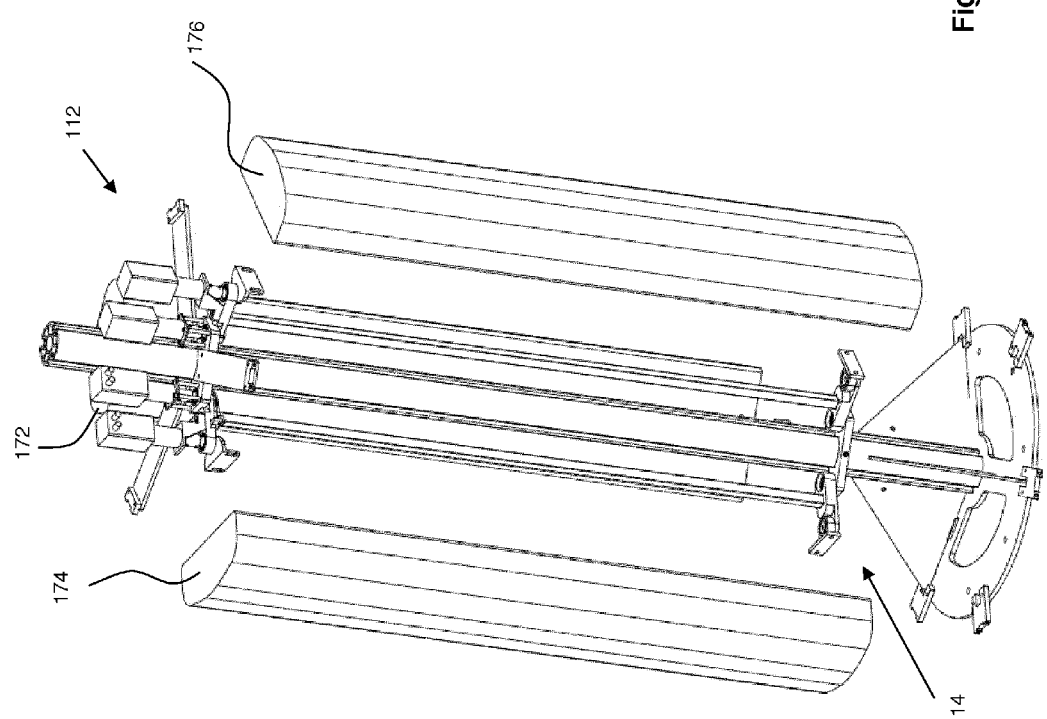

Turning to FIG. 3d, the antennas 172, 174, 176 are provided and attached at each end to the first and second mounting assemblies 112, 114. The completed assembly is shown in FIG. 3e.

Figure 4:
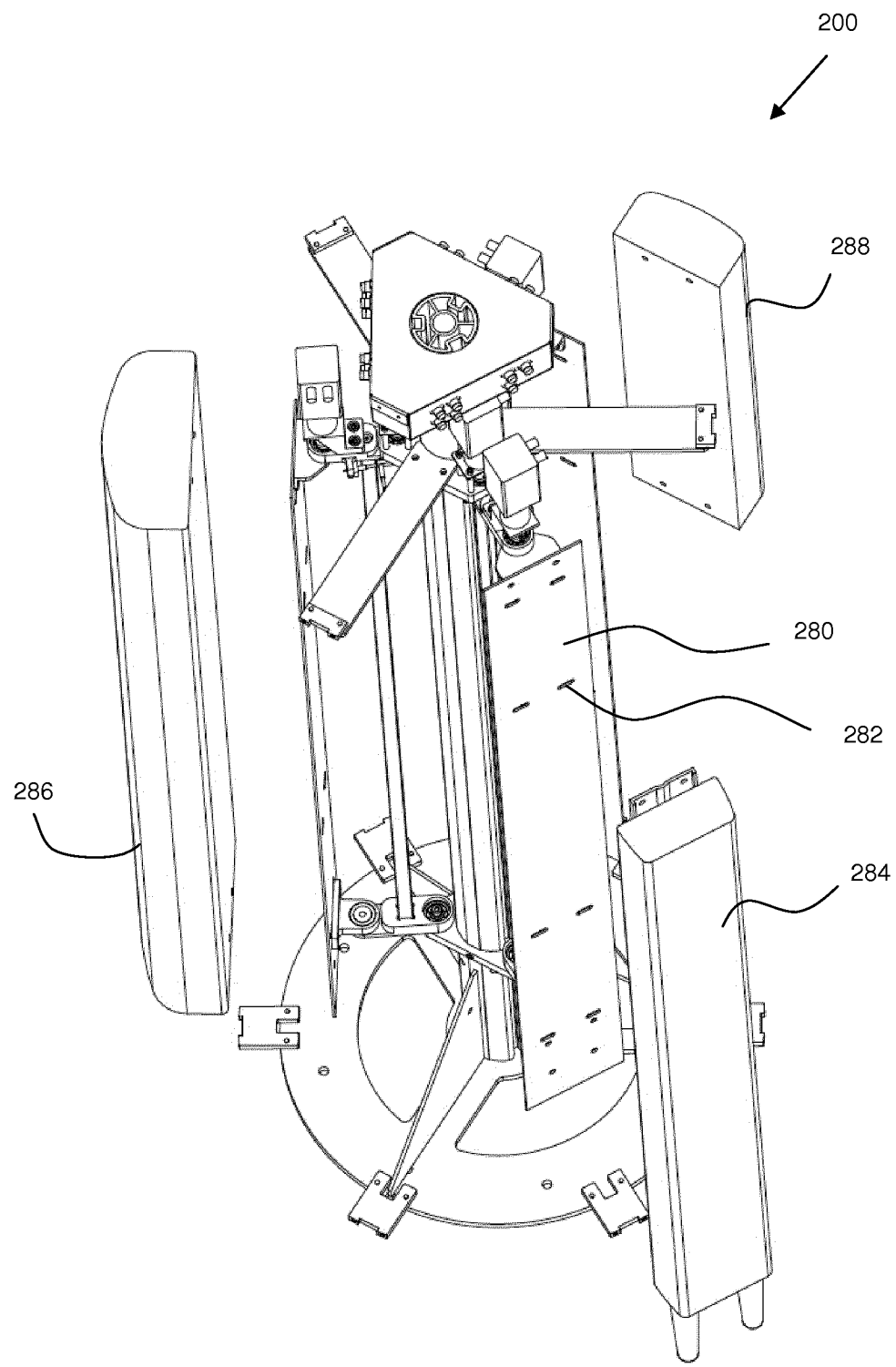
FIG. 4 shows a second mast assembly in accordance with the present invention.

Turning to FIG. 4, an alternative assembly 200 is shown. The main difference with respect to the assembly 100 is that an antenna mounting plates 280 is provided for each antenna. The plates 280 are generally flat and face radially away from the axis 124. Each mounting plate 280 is provided with a plurality of mounting formations such as holes 282, in order to receive several types of antenna as desired. Three different types of antennas 284, 286, 288 are shown by way of example in FIG. 4. The use of the mounting plates avoids the need to vary the position of the mounting assemblies for each different type of antenna.

Figures 5A, 5B:
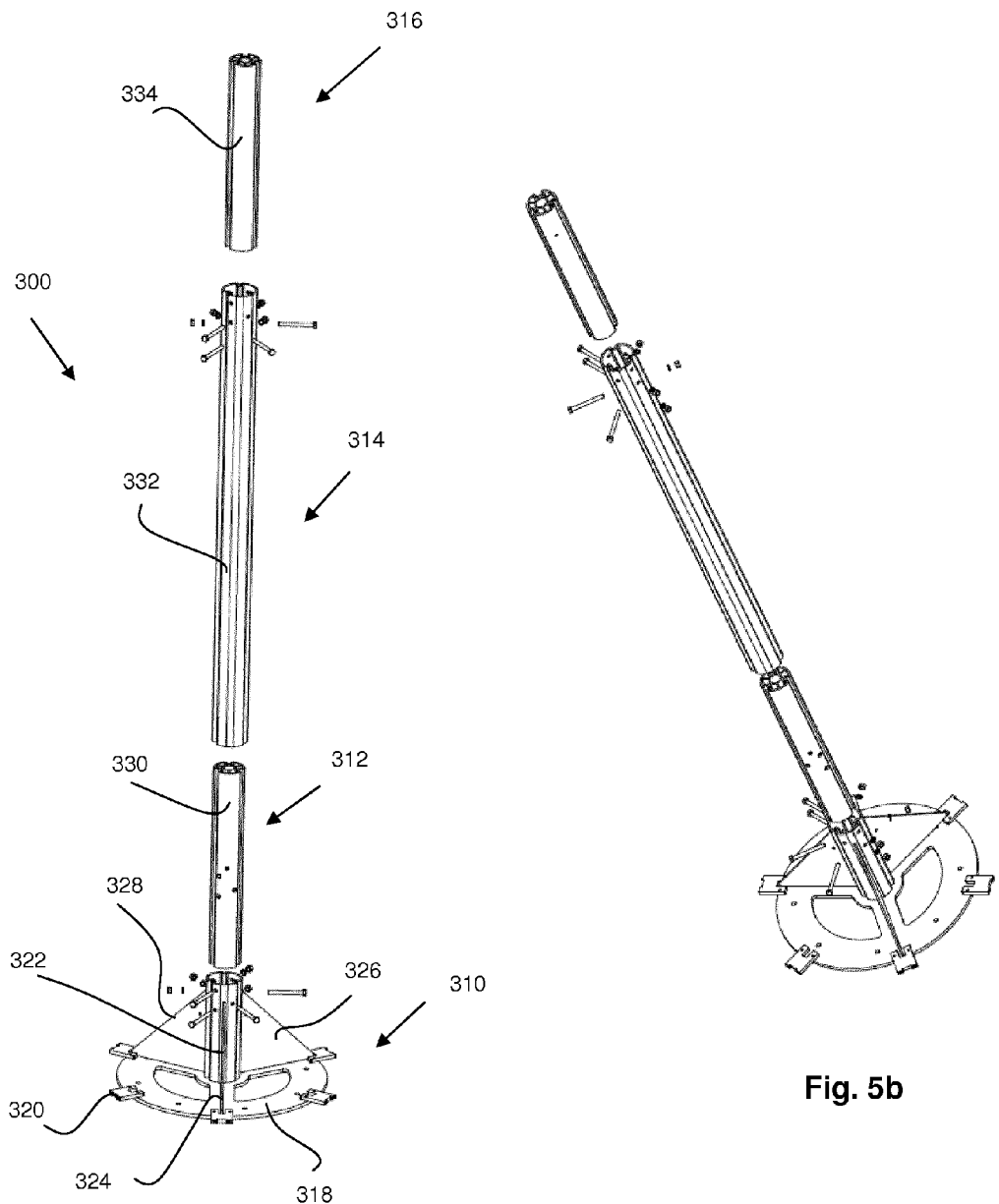
Figure 6:
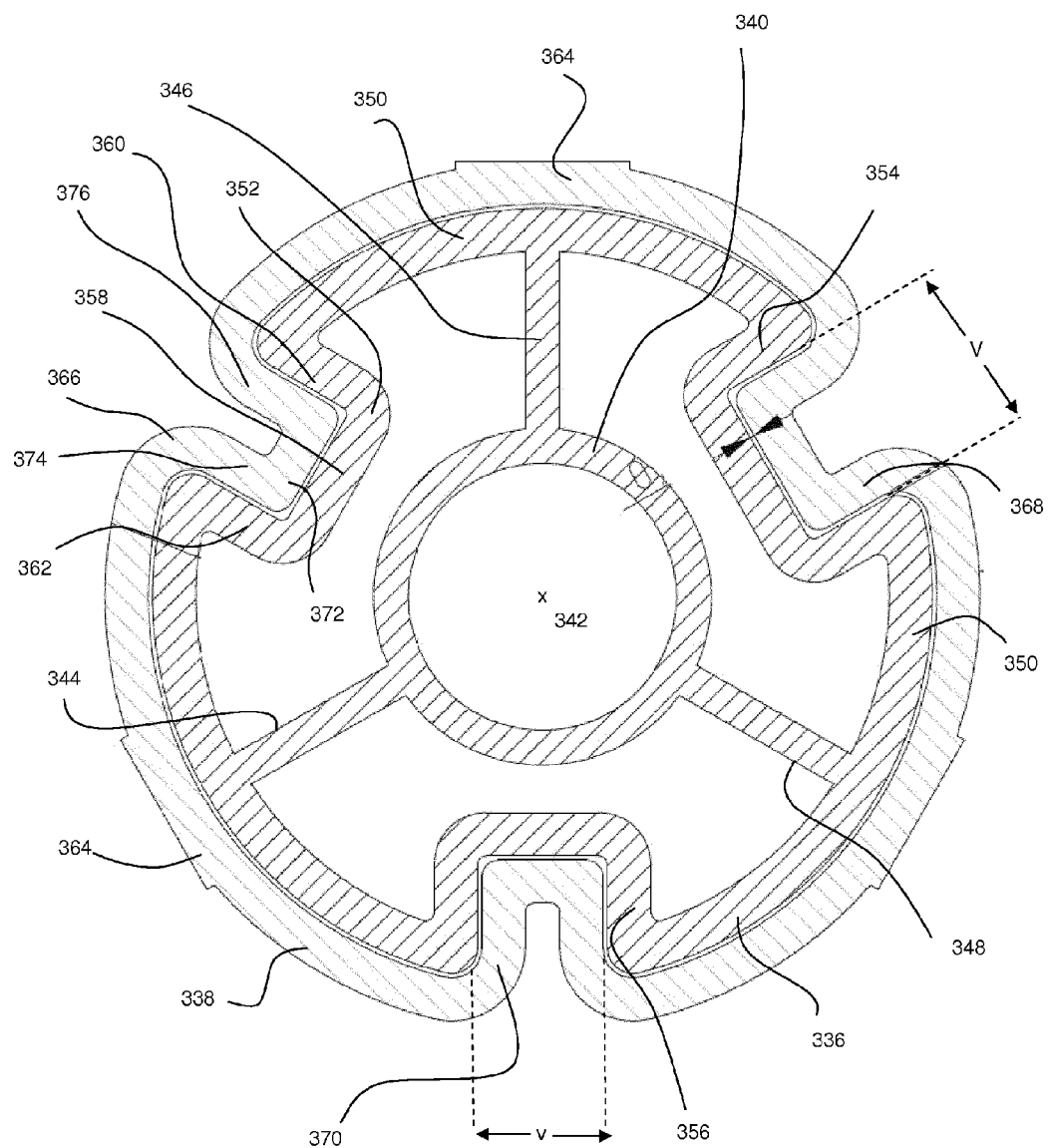
FIG. 6 shows a section view of a part of the mast assembly of FIGS. 5a and 5b.

Turning to FIGS. 5a, 5b and 6, a different mast assembly 300 is shown. The assembly 300 is an example of how a modular mast can be constructed according to the present invention (as opposed to assemblies 100, 200 which relate to antenna mounting). The assembly comprises a base 310, a first intermediate mast component 312, a central mast component 314 and a second intermediate mast component 316.

The base 310 comprises a base plate 318 similar to the base plate 118 of the mast assembly 100. Mounting points 320 are provided for mounting to a relevant structure. The base 310 defines a short extruded section 322 extending perpendicularly from the centre of the base. Support flanges 324, 326 and 328 are provided to support the extruded section 322.

The first intermediate mast component 312 comprises an extruded section 330 which will be described in more detail below. The central mast component 314 also comprises an extruded section 332 of a similar profile to the extruded section 322 and will be described in more detail below. Finally, the second intermediate mast component 316 comprises an extruded section 334 being similar in profile to the extruded section 330 of the first intermediate mast component 312.

Turning to FIG. 6, an inner extrusion profile 336 and an outer extrusion profile 338 are shown in cross-section.

The inner extruded profile 336 comprises a central circular region 340 having a central axis 342. Three radially extending ribs 344, 346, 358 are provided which extend by a same distance from the central circular region 340 and are spaced equally, i.e. 120 degrees apart.

An outer circular region 350 is provided which joins each of the outer edges of the ribs 344, 346, 348. At equidistant positions offset at 60 degrees from each of the ribs 344, 346, 348, there are positioned recesses 352, 354, 356 in the outer circular region 350. Each of the recesses 352, 354. 356 generally describes a rectangular profile having a flat base portion 358 and two side wall portion 360, 362 shown with reference to recess 352.

The first and third recesses 352, 356 have a width between their side walls of v as shown with reference to the third recess 356. The second recess 354, however, has a width across its side walls of V, wherein V is higher than v. The functional benefit of this feature will be described below.

Moving on to the outer extruded profile 338, it comprises a generally circular wall section 364 having three recesses 366, 368, 370 extending inwardly in a generally radial direction. Each of the recesses comprises a base 372 and two side walls 374, 376 as shown with respect to the first recess 366. The first and third recesses 366, 370 of the outer extruded profile have an outer width v corresponding to the inner width v of the recesses 352, 256 of the inner extruded profile. Similarly, the second recess 368 and the outer extruded profile 338 has an outer width V corresponding to the inner width V of the second recess 354 of the inner extruded profile 336.

As such, and as shown in FIG. 6, the two profiles can only be matingly engaged in one relative rotational position about the axis 342.

Putting the view of FIG. 6 in context, the inner extruded profile 336 is representative of a cross-section through either the first intermediate mast component 312 or the second intermediate mast component 316. Similarly, the outer extruded profile is a representation of a cross-section through the extruded section 322 of the base 310 or the extruded section 322 of the central mast component 314.

This facilitates modular assembly such that the first intermediate mast component 312 can be simultaneously mated with the extruded section 322 of the base 310 and the extruded section 332 of the central mast component 314. Similarly, the second intermediate mast component 316 can be mated with the extruded section 332 of the central mast component 314 and subsequently attached to another suitable component, or even a further extruded mast component so as to extend the height of the assembly.

Each of the sections are fastened in place as shown in FIGS. 5a and 5b with mechanical fasteners passing through both mating sections.

Figure 7:
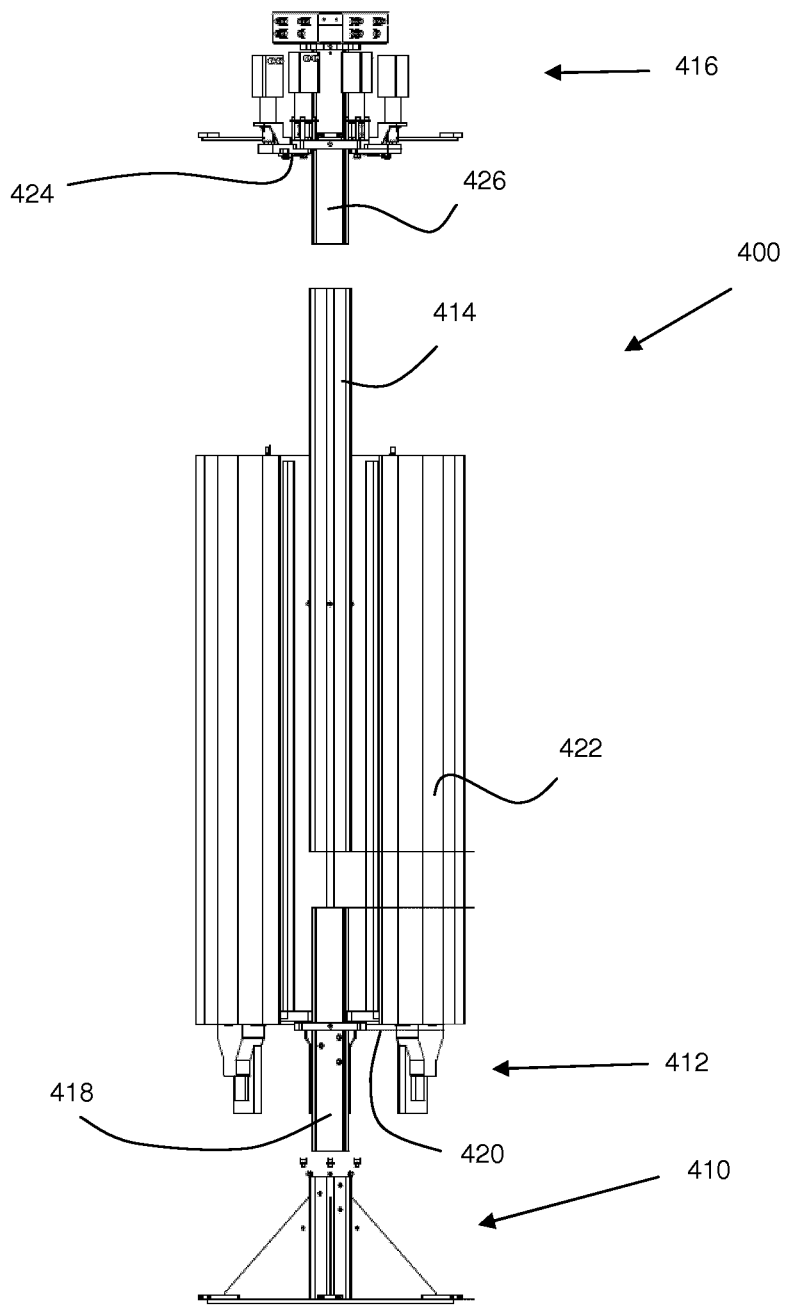
FIG. 7 shows a side view of a fourth mast assembly in accordance with the present invention.

Turning to FIG. 7, a similar arrangement to that shown in FIGS. 5a and 5b is shown, however, in the context of directly mounting an antenna receiving formation to the mast component.

The mast assembly 400 comprises a base 410 which is substantially similar to the base 310 of the mast assembly 300 (and as such will not be described in any more detail here). The central mast component 414 of FIG. 7 is also similar to the central mast component 314 of the assembly 300.

In place of the first and second intermediate mast components 312, 316, there is provided a lower antenna mounting assembly 412 and an upper mounting assembly 416.

The lower antenna mounting assembly 412 has an extruded section 418 which is substantially similar to the extruded section 330 of the first intermediate mast component 312. The difference is that an antenna mounting flange 420 is provided approximately midway along the extruded section which has various attachments suitable for the mounting of an antenna 422.

Similarly, with reference to the upper antenna mounting assembly 416, an antenna mounting flange 424 is provided along the extruded section 426 with active antenna mounting means thereon for mounting and movement of the various antennas 422.

When assembled, as shown in FIG. 7, the lower and upper antenna mounting assemblies slot into the base 410 and the central mast component 414 and can be fastened therewith by mechanical fasteners. It will also be noted that the flanges of both antenna mounting assemblies 414, 416 provide mechanical stops to inhibit excessive intrusion of the extruded section within the extruded section of the central mast component 414.

Turning to FIGS. 8a and 8b, an alternative arrangement is shown for a modular mast assembly 500. The assembly 500 comprises a base 510, a first modular mast component 512, a second modular mast component 514 and a third modular mast component 516.

The base 510 comprises a base plate 518, having three axially extending and upstanding fingers 520, 522 and 524. A stiffening plate 526 is provided offset from the base plate 518 in order to stiffen the assembly.

As shown in FIG. 8b, each of the fingers 520, 522, 524 at a generally rectangular cross-section with the longer side of the rectangle facing in a tangential direction with respect to the plates 518, 526.

The first mast component 512 comprises an extruded section 528 which, as shown in FIG. 8b, has a central circular portion 530, three equally spaced radially outwardly protruding ribs 532, 534, 536. At the end of each of the ribs 532, 534, 536 there is provided a rectangular recess 538, 540, 542 respectively. An outer circular section 544 connects the three ribs 532, 534, 536.

When assembled to the base, each of the fingers 520, 522, 524 protrudes within the recesses 538, 540, 542 as shown in FIG. 8b. As such, the base and the first mast component 512 are locked together in its rotation.

As shown in FIG. 8a, the second mast component 514 has an identical extruded profile to the first mast component 512. Three connecting rods 546, 548, 550 are provided which extend within the respective recesses of the first and second mast components in order to secure them together.

The third mast component 516 comprises a series of antennas therewithin and its outer surface represents a radome 552 instead of being extruded section all the way through, the third mast component 516 comprises a bottom flange 554 from which a series of three rods 556, 558, 560 project downwardly to engage in the second mast component 514.

It will be understood with this arrangement that any number of mast components may be used to increase or decrease the height of the mast and therefore the antenna contained within the radome 552. Similarly, because the sections are extruded, the length of each particular module can be varied as desired by the manufacturer.

Figure 9A:
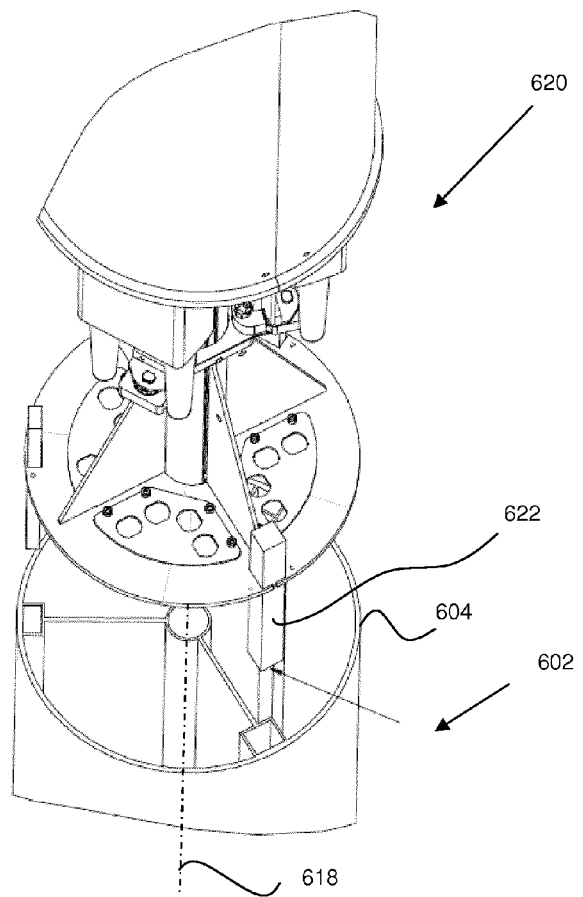
FIG. 9a shows a perspective view of a sixth mast assembly in accordance with the present invention.
Figure 9B:
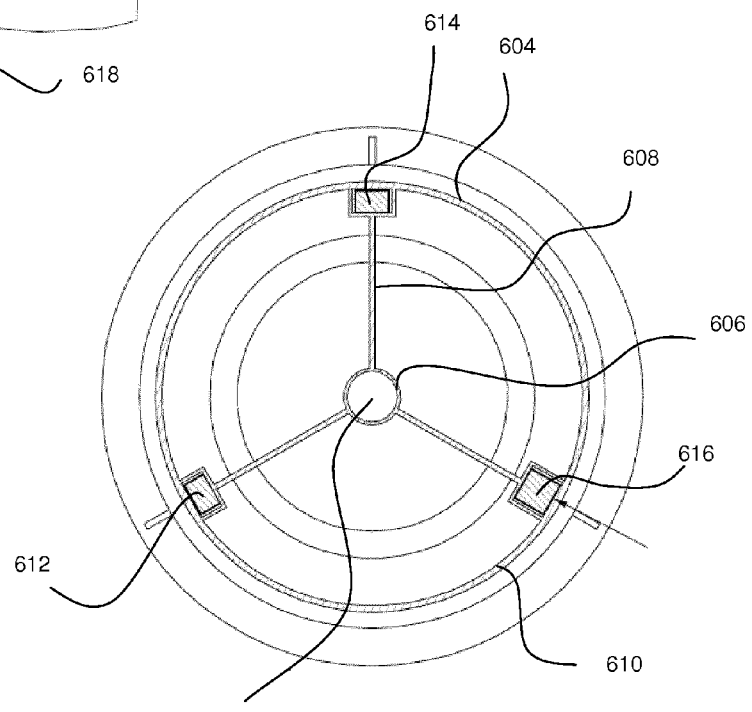

FIGS. 9a and 9b show an assembly 600 in which a mast component 602 comprises an extruded section 604 having a central region 606, three radial ribs 608 and an outer wall 610. Rectangular orifices 612, 614, 616 are provided between the ribs 608 and the outer wall 610. The orifice 616 is a different shape to (larger than) the others, and as such mounting of another mast component or an antenna 620 (see FIG. 9a) can only occur in one position about a longitudinal axis 618 because there is only one corresponding rod 622 of that size.

As shown in the above embodiments, the advantage of using mating extruded components as shown is that the area of contact between the components when they are assembled is great, therefore reducing point stresses and potential damage under high winds, etc., during use.

A further advantage of an extruded structure is that aluminium may be used which is extremely light. The provision of the majority of the material towards the outer edge of the extrusions also provides great strength and stiffness.

Each of the above embodiment use the elongate extrusions as structural members. According to the invention, such extrusions may also be used as non-load bearing or minor-load bearing structures whose primary function is to provide alignment.

Figure 10:
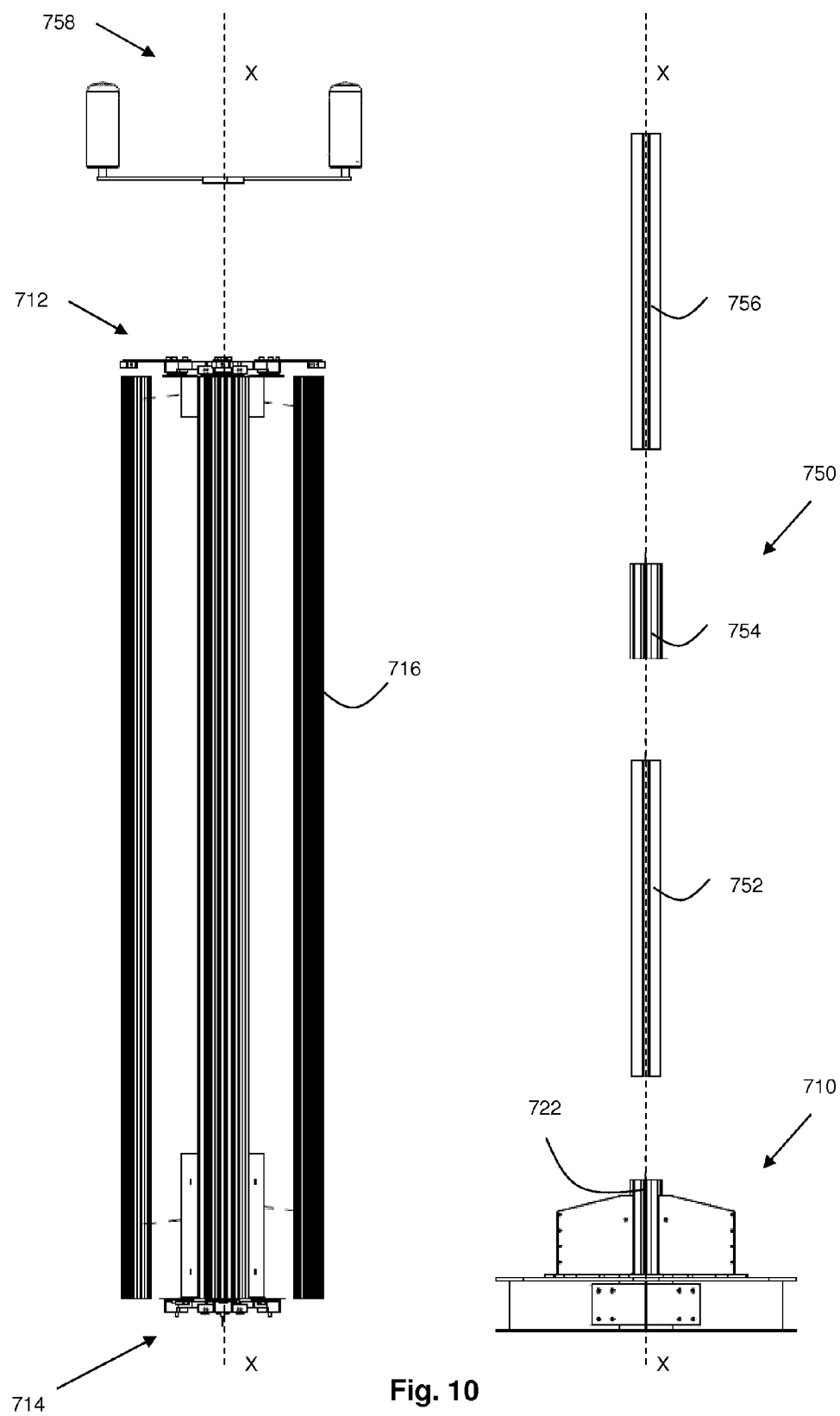
FIG. 10 shows a side view of a part of a sixth mast assembly in accordance with the present invention.
Figure 11:
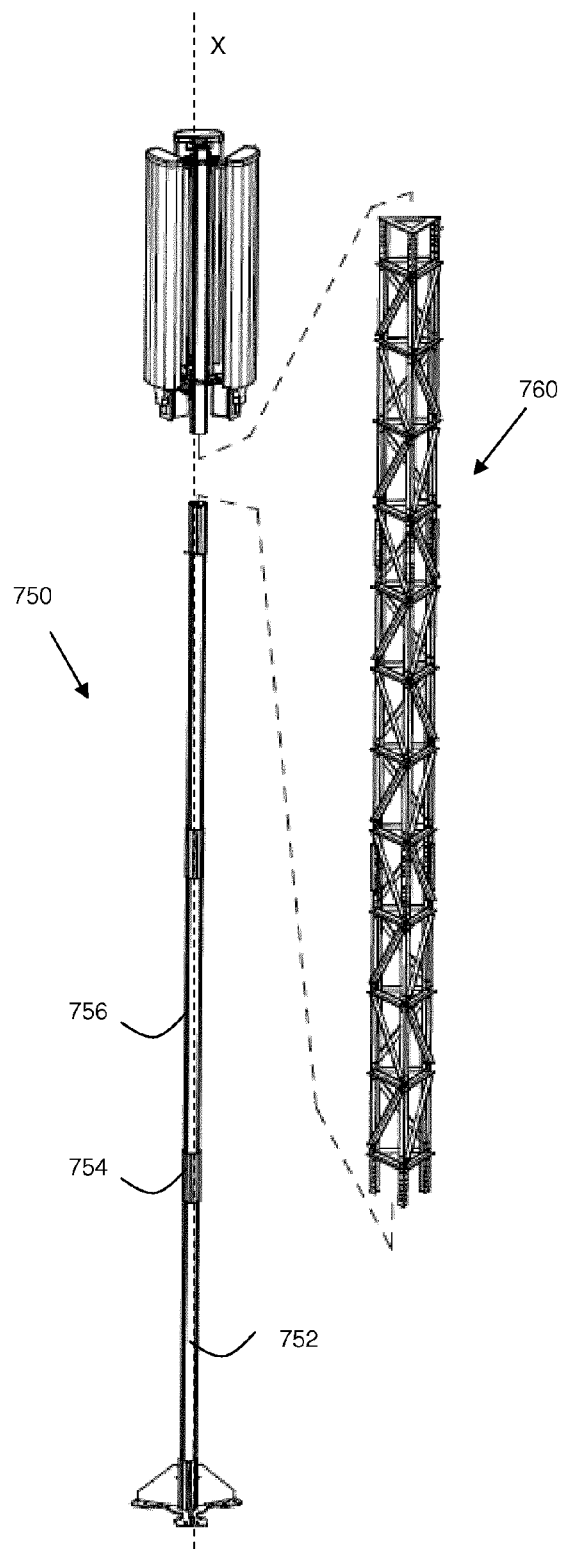
FIG. 11 shows an exploded perspective view of the sixth mast assembly in accordance with the present invention; and, FIG. 12 shows a perspective view of the sixth mast assembly.
Figure 12:
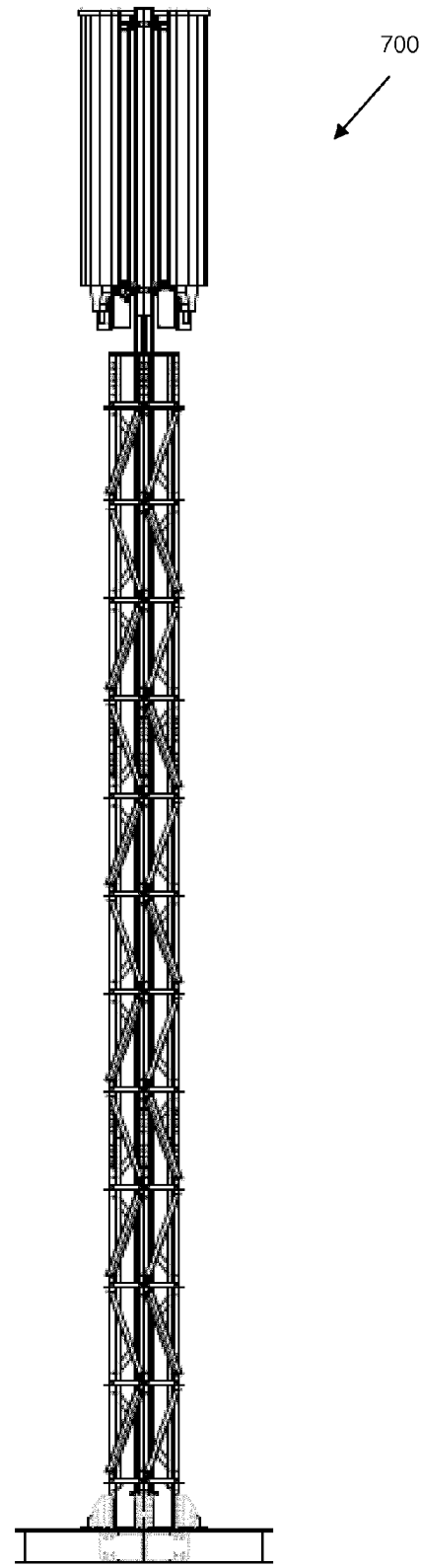

Referring to FIGS. 10 to 12, there is provided a cellular communications mast assembly 700. The assembly 700 generally comprises a mast base component 710, a first antenna mounting assembly 712, a second antenna mounting assembly 714, and a plurality of antennas 716.

The mast base component 710 and the mounting assemblies are similar to the mast component 310 and mounting assemblies 112, 114 respectively.

The mast base component 710 defines a short extruded female section 722 projecting centrally therefrom along a primary mast axis X.

An orientation sub-assembly 750 is provided comprising a first male section 752, a female section 754 and a second male section 756. Further male and female sections are shown in FIG. 11. Each male and female section (including the female section 722 on the component 710) has a mating profile per FIG. 6—i.e. they can only be assembled in a single angular orientation about X.

The antenna mounting assemblies define female orifices for receiving the profile of the male components.

A GPS antenna 758 is provided, which also comprises a female formation for receiving the male profile.

The orientation sub-assembly 750 is assembled to the base component 710 as shown in FIG. 11 such that it extends along the axis X. A load-bearing mast 760 is provided, having a truss structure. The mast 760 is generally triangular in section, and surrounds the orientation assembly 750.

The orientation sub-assembly 750 and mast 760 are assembled such that the orientation sub-assembly projects from the mast 760 by a length sufficient to be engaged by both mounting assemblies 712, 714.

The mounting assembly 714 is then secured to the top of the mast 760.

As will be noted, the mast orientation does not matter. The datum point set by the base can be carried through the mast assembly to the antennas by the orientation sub-assembly. In other words, one structure is used for datum transfer, and a separate structure for load-bearing. This eliminates the requirement for the larger, load bearing structure to be manufactured to a high tolerance, and saves cost.

The GPS antenna 758 may be used to confirm the position of the antennas

Alternatively, the GPS antenna may be used to determine the position of the antennas, because it is known how the GPS antenna is orientated with respect to the antenna mounting brackets (because they are mounted on the same orientation sub-assembly).

Therefore the orientation sub-assembly may be used to carry a datum point through from a previously positioned base, or used to ensure that the antennas and a compass are assembled in a predetermined alignment.

FIG. 12 shows the full assembly 700. It will be noted that the orientation sub-assembly could be removed after alignment of the antenna mounting brackets.

Variations fall within the scope of the present invention.

Any particular extruded profile may be used providing a mating formation is provided. The extruded profile does not have to be circular, but may be elliptical or polygonal for example.

The sections of the orientation sub-assembly 750 do not need to be fully extruded. They may instead have the relevant mating profiles defined at each end, with a different cross section in the centre. This is particularly true for the sections 752, 756.

The invention claimed is:

1. A cellular communications antenna mast assembly comprising:
a first component having a longitudinal axis and a first profile oriented perpendicular to the longitudinal axis, the first profile formed to include a first recess and a second recess spaced apart from the first recess, the first recess having at least one different dimension than the second recess; and,
a second component having a second profile arranged to mate with the first profile so as to co-engage the first component and second component to constrain relative rotation thereof about the longitudinal axis, in which the first profile and the second profile is shaped so as to permit engagement with the first and second recesses of the first profile to align the second component in only one angular position about the longitudinal axis;
in which one of the first and second components is connected to a mast component, and the other of the first and second components is connected to an antenna mounting bracket, such that the mast component and antenna mounting bracket are aligned in a predetermined orientation.

2. A cellular communications antenna mast assembly according to claim 1, in which the first component comprises an extruded portion which defines the first profile in section.

3. A cellular communications antenna mast assembly according to claim 2, in which the first component is entirely extruded.

4. A cellular communications antenna mast assembly according to claim 1, in which the first profile is defined as the edge of an orifice, and the second component comprises a male formation defining the second profile.

5. A cellular communications antenna mast assembly according to claim 4 in which the second component is at least partially extruded.

6. A cellular communications antenna mast assembly according to claim 1, in which the first component defines a wall having an outer surface, in which the first profile lies on an interior surface of the wall.

7. A cellular communications antenna mast assembly according to claim 1, in which the second component comprises a mechanical stop to constrain relative axial movement of the first component and the second component.

8. A cellular communications antenna mast assembly according to claim 7 in which:
the first component has a first end and a second end,
the second component is mounted at the first end,
a third component is provided and is mounted at the second end, and,
in which the second and third components define spaced mounting points of an antenna bracket.

9. A cellular communications antenna mast assembly according to claim 1 in which the first profile is defined as an outer edge of a male formation, and the second profile is female.

10. A cellular communications antenna mast assembly according to claim 9 in which the second component comprises at least one antenna mounting formation.

11. A cellular communications antenna mast assembly according to claim 1 comprising a radially oriented mechanical fastener arranged to constrain relative axial motion of the first and second components.

12. A cellular communications antenna mast assembly according to claim 10 comprising a third component being spaced from the second component and comprising at least one antenna mounting formation.

13. A cellular communications antenna mast assembly according to claim 1 comprising a third component having the first profile, such that the second component mates simultaneously with the first and third components.

14. A cellular communications antenna mast assembly according to claim 13 in which the first and third components abut to restrain relative axial movement.

15. A method of manufacture of a cellular communications antenna mast assembly comprising the steps of:
extruding a first component comprising a longitudinal axis and a first profile oriented perpendicular to the longitudinal axis, the first profile formed to include a first recess and a second recess spaced apart from the first recess, the first recess having at least one different dimension than the second recess,
providing a second component having a second profile complementary to the first profile, in which the first and second profiles can only be assembled in a single angular orientation about the longitudinal axis due to engagement with the first and second recesses,
providing an antenna mounting bracket attached to the second component;
assembling the first and second components by mating the profiles.

16. A method of manufacture of a cellular communications antenna mast assembly according to claim 15 in which the step of assembling comprises the step of:
   inserting the first component into an orifice of the second component.

17. A method of manufacture of a cellular communications antenna mast assembly according to claim 15 in which the step of assembling comprises the step of:
   inserting the second component into an orifice of the first component.

18. A method of manufacture of a cellular communications antenna mast assembly according to claim 15 comprising the step of:
   axially fastening the first and second components.

19. A method of aligning an antenna mounting bracket to a mast sub-assembly comprising the steps of:
   providing a mast sub-assembly;
   providing an antenna mounting bracket;
   providing at least two components each having complementary profiles, at least one profile formed to include a first recess and a second recess spaced apart from the first recess, the first recess having at least one different dimension than the second recess, the profiles configured so as to co-engage in at least the first and second recesses to constrain relative rotation thereof about a longitudinal axis and, in which the profiles are configured to permit engagement in only a single rotational orientation about the longitudinal axis;
   attaching the mast sub-assembly to a first of the at least two components;
   attaching the antenna mounting bracket to another of the at least two components;
   assembling the plurality of components along the longitudinal axis to align the antenna mounting bracket with the mast sub-assembly.

20. A method of aligning an antenna mounting bracket according to claim 19, in which the mast sub-assembly comprises a mast base.

* * * * *